US009587394B2

(12) United States Patent
McDaniel, Jr.

(10) Patent No.: US 9,587,394 B2
(45) Date of Patent: *Mar. 7, 2017

(54) PORTABLE SHELTERS, RELATED SHELTER SYSTEMS, AND METHODS OF THEIR DEPLOYMENT

(71) Applicant: Reaction, Inc., Austin, TX (US)

(72) Inventor: Michael D. McDaniel, Jr., Austin, TX (US)

(73) Assignee: Reaction, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/671,608

(22) Filed: Mar. 27, 2015

(65) Prior Publication Data

US 2015/0197930 A1 Jul. 16, 2015

Related U.S. Application Data

(60) Continuation of application No. 14/594,607, filed on Jan. 12, 2015, now abandoned, which is a continuation of application No. 14/216,587, filed on Mar. 17, 2014, now abandoned, which is a continuation of application No. 13/760,895, filed on
(Continued)

(51) Int. Cl.
| | |
|---|---|
| *E04H 15/18* | (2006.01) |
| *E04B 1/343* | (2006.01) |
| *E04H 1/12* | (2006.01) |
| *E04H 9/14* | (2006.01) |
| *E04H 15/02* | (2006.01) |
| *E04H 15/48* | (2006.01) |
| *E04H 15/00* | (2006.01) |

(52) U.S. Cl.
CPC ...... *E04B 1/34336* (2013.01); *E04B 1/34331* (2013.01); *E04B 1/34352* (2013.01); *E04B 1/34384* (2013.01); *E04H 1/1205* (2013.01); *E04H 9/14* (2013.01); *E04H 15/008* (2013.01); *E04H 15/02* (2013.01); *E04H 15/18* (2013.01); *E04H 15/48* (2013.01); *Y10T 29/49819* (2015.01); *Y10T 29/49826* (2015.01)

(58) Field of Classification Search
CPC ......... E04H 15/48; E04H 15/18; E04H 15/02; E04H 15/008; E04H 1/12; E04H 1/02; E04B 1/34331; E04B 1/34336; E04B 1/34352; E04B 1/3431; Y10T 29/49826; Y10T 29/49819
USPC ......... 135/87, 90, 95, 97, 99, 123, 128–130, 135/137, 143–144, 148–150, 151, 905, 135/115, 116; 52/36.1–36.2, 79.3, 79.5, 52/143, 248, 29, 79.2
See application file for complete search history.

(56) References Cited

U.S. PATENT DOCUMENTS 2,236,677 A * 4/1941 Schuyler ............... E04H 15/324
 135/123
2,485,914 A 10/1949 Owens
(Continued)

FOREIGN PATENT DOCUMENTS

| DE | 19537535 A1 | 3/1997 |
|---|---|---|
| FR | 2604463 A1 | 4/1988 |
| JP | 2010024818 A | 2/2010 |

*Primary Examiner* — Winnie Yip
(74) *Attorney, Agent, or Firm* — Fish & Richardson P.C.

(57) ABSTRACT

Method of deployment of portable shelters is described. The shelters or housing units may be deployed in emergency housing situations and may be grouped into systems of shelters.

10 Claims, 11 Drawing Sheets

Related U.S. Application Data

Feb. 6, 2013, now abandoned, which is a division of application No. 13/279,886, filed on Oct. 24, 2011, now abandoned, which is a division of application No. 12/098,921, filed on Apr. 7, 2008, now Pat. No. 8,042,562.

(60) Provisional application No. 60/912,079, filed on Apr. 16, 2007.

(56) References Cited

U.S. PATENT DOCUMENTS

| | | |
|---|---|---|
| 2,910,994 A | 11/1959 | Joy |
| 2,932,304 A | 4/1960 | Voege |
| 3,116,949 A * | 1/1964 | Muse ............... B60P 3/1041 280/414.1 |
| 3,256,440 A | 6/1966 | Virgil |
| 3,478,472 A | 11/1969 | Kwake |
| 3,498,011 A * | 3/1970 | Lindgren ............. E04H 1/125 109/73 |
| 3,566,554 A | 3/1971 | Schaffer |
| 3,629,874 A | 12/1971 | Beller |
| 3,702,617 A | 11/1972 | Franzen |
| 3,703,181 A | 11/1972 | Tholen |
| 3,835,480 A | 9/1974 | Harding |
| 3,923,134 A | 12/1975 | Rezazadeh |
| 3,932,925 A | 1/1976 | Harding |
| 3,949,528 A | 4/1976 | Hartger |
| 4,031,572 A | 6/1977 | Harding |
| 4,031,573 A | 6/1977 | Romanoff |
| 4,128,204 A | 12/1978 | Wade |
| 4,514,938 A | 5/1985 | Maguire |
| 4,655,013 A | 4/1987 | Ritland |
| 4,664,438 A | 5/1987 | Crepaldi |
| 4,771,581 A | 9/1988 | Nill |
| 4,802,500 A | 2/1989 | Davis |
| 4,887,627 A | 12/1989 | Audet |
| 4,942,895 A | 7/1990 | Lynch |
| 5,007,212 A | 4/1991 | Fritts |
| 5,033,493 A | 7/1991 | Senchuck |
| 5,036,638 A | 8/1991 | Kurtz |
| 5,065,462 A | 11/1991 | Romano |
| 5,093,941 A | 3/1992 | Muller |
| 5,133,378 A | 7/1992 | Tanasychuk |
| 5,172,526 A * | 12/1992 | Morgan ............... B60P 3/34 135/87 |
| 5,222,513 A | 6/1993 | Hilliard |
| 5,319,904 A | 6/1994 | Pascoe |
| 5,331,778 A * | 7/1994 | Mazpule ............ E04B 1/34321 52/264 |
| 5,398,465 A | 3/1995 | Tagg |
| 5,423,150 A | 6/1995 | Hitchcock |
| 5,426,900 A | 6/1995 | Springer |
| 5,489,052 A | 2/1996 | Blood |
| 5,615,521 A | 4/1997 | Simerka |
| 5,749,387 A | 5/1998 | Thompson |
| 5,791,293 A | 8/1998 | Northrop |
| 5,901,727 A | 5/1999 | Kramer |
| 5,916,096 A | 6/1999 | Wiesmann |
| 5,918,614 A | 7/1999 | Lynch |
| 5,921,043 A | 7/1999 | McDonald |
| 5,964,065 A | 10/1999 | Migurski |
| 6,131,343 A | 10/2000 | Jackson |
| 6,192,633 B1 | 2/2001 | Hilbert |
| 6,250,022 B1 | 6/2001 | Paz |
| 6,418,672 B1 | 7/2002 | Hampel |
| 6,439,120 B1 | 8/2002 | Bureaux |
| 6,467,221 B1 | 10/2002 | Bigelow |
| 6,739,095 B2 | 5/2004 | Glynos |
| 6,748,962 B2 | 6/2004 | Miller |
| 6,766,623 B2 | 7/2004 | Kalnay |
| 6,948,280 B2 | 9/2005 | Marcinkowski |
| 6,973,758 B2 | 12/2005 | Zeik |
| 7,207,076 B2 | 4/2007 | Gardner |
| 7,213,374 B2 | 5/2007 | Harris |
| D564,615 S | 3/2008 | Ruben |
| 8,002,141 B2 | 8/2011 | Duffield |
| 8,042,562 B1 | 10/2011 | McDaniel |
| 2001/0007260 A1 | 7/2001 | Rousselle |
| 2002/0056247 A1* | 5/2002 | Williams ............ A01K 1/0041 52/648.1 |
| 2002/0153033 A1 | 10/2002 | Miller |
| 2003/0024173 A1 | 2/2003 | Cohen |
| 2004/0222336 A1 | 11/2004 | Miller |
| 2005/0055893 A1 | 3/2005 | Goodwin |
| 2005/0076584 A1 | 4/2005 | Loranger |
| 2005/0189009 A1 | 9/2005 | Walter |
| 2005/0189010 A1 | 9/2005 | Sumner |
| 2005/0241593 A1 | 11/2005 | Kaura |
| 2006/0048459 A1 | 3/2006 | Moore |
| 2006/0055193 A1 | 3/2006 | Colborne |
| 2006/0103154 A1 | 5/2006 | Berry |
| 2006/0107903 A1 | 5/2006 | Jin |
| 2007/0074462 A1 | 4/2007 | Linares |
| 2007/0157890 A1* | 7/2007 | Kaura ................. A01K 1/0088 119/496 |
| 2008/0016792 A1* | 1/2008 | Messman ............ E04B 1/3205 52/93.1 |
| 2009/0235445 A1 | 9/2009 | Goldstein |
| 2009/0272415 A1* | 11/2009 | Zepeda ................ E04H 15/52 135/130 |

* cited by examiner

PORTABLE SHELTERS, RELATED SHELTER SYSTEMS, AND METHODS OF THEIR DEPLOYMENT

REFERENCE TO RELATED APPLICATIONS

This application is a continuation of co-pending U.S. application Ser. No. 14/594,607, filed Jan. 12, 2015, which in turn is a continuation of U.S. application Ser. No. 14/216,587, filed Mar. 17, 2014, which in turn is a continuation of U.S. application Ser. No. 13/760,895, filed Feb. 6, 2013, which in turn is a divisional of U.S. application Ser. No. 13/279,886, filed Oct. 24, 2011, which in turn is a divisional of U.S. application Ser. No. 12/098,921, filed Apr. 7, 2008, now U.S. Pat. No. 8,042,562, which claims the benefit and priority of U.S. Provisional Application No. 60/912,079, filed Apr. 16, 2007, the disclosures of which are incorporated herein by reference.

TECHNICAL FIELD

This invention relates to the field of portable shelters, shelter systems, and methods of portable shelter deployment. Specifically, this invention relates to temporary housing shelters which may be deployed in emergency housing situations.

BACKGROUND

Until now, humanitarian aid organizations, disaster relief agencies, and most governments were missing a critical tool for emergency recover efforts-readily deployable housing for displaced individuals and families. After most natural and man-made disasters, housing needs can be broken into three main periods: short-term housing, medium-term housing, and long-term housing. A few types of specific disasters can be forecast, such as hurricanes, which create a different housing need and a fourth period: pre-event sheltering. The general housing needs during and between those periods are drastically different. Currently, there are no emergency housing systems that can address all four periods and yet be flexible enough to transition from one housing period to the next as needs change, creating a housing gap that exacerbates recovery efforts and increases victims' misery.

For example, when Hurricane Katrina struck Louisiana and Mississippi coastal regions of the United States in August 2005, many residents of those states were left with houses submerged under water or without homes or shelter of any type. After residents in more northern parts of Mississippi were having power returned to their homes, many on the Mississippi Gulf Coast were still living in tents in the parking lots of destroyed retail stores. In Louisiana, many houses also were destroyed in the southeastern parishes, and many New Orleans residents, who were unable to evacuate before the storm, were stranded at the Louisiana Superdome or New Orleans Convention Center in detestable conditions.

After Hurricane Katrina, one government agency attempted to provide housing assistance in the form of trailers, housing vouchers, leased cruise ship cabins, etc. to those most affected by the storm. However, each of these systems has major drawbacks.

Specifically, regarding the housing vouchers, they proved to be inadequate at sheltering large populations for several obvious reasons. First, a housing voucher requires an individual or a family to be relocated to other areas of the affected region in order to shelter them in existing housing units. During a large displacement of the population due to a disaster such as Hurricane Katrina, regional housing quickly reaches capacity, so the remainder of the displaced population is moved out of the region. In the case of Katrina, families from New Orleans were relocated as far away as Boston and Phoenix. By redistributing a large number of people in such an abrupt and rapid manner, regional infrastructure is overwhelmed and cannot maintain day-to-day operations. Housing vouchers present numerous problems with fraud, abuse, and the cost of living in the varying locations to which families are displaced.

Cruise ships were leased after Katrina for a relatively high nightly cost on a per person basis and for a maximum stay of six months. While these ships do allow a number of people to stay in a compact, self-sufficient area for an extended time period, the cruise ships are limited to deep-water ports for deployment, can only handle a small amount of the population from a major disaster, and must be leased or rented from private or foreign fleets.

One governmental agency was widely criticized for the slow and inadequate response in providing temporary housing to residents in need in Mississippi and Louisiana and for the high cost of the travel-type trailers provided to residents. The subject trailers cost approximately $65,000.00 each for purchase and setup on site. This price did not include transportation costs of each trailer to the deployment site or the removal costs of each trailer once it is no longer needed. Also, the trailers are not designed for long-term storage and are too bulky to efficiently store in large numbers. Moreover, the trailers were of the type that one truck could only pull one trailer, which resulted in the trailers being individually delivered to individuals and families in Mississippi and Louisiana using individual pickup trucks, which resulted in slow deployment of these trailers to those residents in need of temporary housing.

Therefore, it is clear that past solutions have many flaws without even taking into consideration the sheer costs associated with each. As such, there exists a need for housing for similarly displaced individuals and families.

SUMMARY OF THE INVENTION

The present invention meets this need by providing, amongst other things, portable shelters which can be deployed individually or as part of a larger system of shelter. The present invention also provides a facile method of deploying portable shelters to meet these housing needs.

The present invention provides a better solution to the housing gap—comprehensive, rapid-deploy shelters and shelter systems with a variety of customizable configurations to meet any challenge related to the actual disaster or deployment site. The systems of the present invention comprise shelter units, accessories, and supporting infrastructure that can be easily transported on a rapid timeframe. The systems' deployment sites can keep displaced populations as close to their homes as safely possible. The individual shelter units of the systems of the present invention provide safe, private sleeping arrangements for individuals and families. Each unit could offer power and climate control and would offer security, durability, and expandability for longer-term deployments. System components can endure long-term storage in warehouse-type environments, be rapidly transported through conventional means, and be fully deployable in large numbers in less than 24 hours. Also, the financial impact of a large-scale disaster can be somewhat tapered by creating a complete system for the very purpose of emergency housing that is easily transportable, reusable, and maintainable.

This emergency housing system is designed to be as flexible as possible in terms of deployment. This flexibility allows the system to address almost any mass housing need that may arise from natural disasters to war refugees. Below are the two main types of deployment scenarios the system operates under, soft deployment and hard deployment. A soft deployment uses a host facility augmented only by the shelter units; whereas, a hard deployment essentially creates a self-sustaining community at virtually any location by deploying shelter units along with power generators, climate control equipment, sanitation facilities, and medical service facilities. These two main deployment scenarios may also be blended to provide a tailored solution to a specific circumstance. For example, a partial system may be deployed at a host facility. The host facility could provide central medical care, food services, and sanitation facilities while the emergency housing system provides the living/sleeping quarters, partial power, and climate control. There are many of options that exist between these two scenarios and this system can be tailored to fit any situation.

Specifically, two particular embodiments of the shelters of this invention, which are discussed in greater detail infra, are "soft-walled shelters" which each comprise rigid top and bottom frames and collapsible support arms connecting each rigid top frame its respective rigid bottom frame and "rigid shelters" which each comprise a hard shell member and a rigid floor member which are interlockable one to the other.

In a soft deployment, the shelter units are deployed at an existing facility that is designed to handle large crowds, such as a sports arena or a convention center. In this scenario, the shelter units provide living/sleeping quarters for people while the adjacent facility is used for power, sanitation facilities, and food services. This option allows an extremely rapid response to a disaster event since only the shelter units are deployed from the system and the existing host facility provides the additional support. Depending on the host facility and the type of disaster being addressed, it may make sense to deploy shelters inside that facility. In the soft deployment, either the soft-wall shelters or the rigid shelters or some combination thereof can be used. However, because the soft-wall shelter collapses into a small enough package for storage and transport that it will fit through most double doorways, the soft-wall shelter is preferable in soft deployment. This would allow a possible deployment site, such as the Astrodome in Houston, Tex., to shield shelters from extreme weather conditions while directly powering and providing its own climate control systems to heat or cool the shelters.

In a hard deployment, the entire shelter system is deployed without the aid of an existing facility. In this scenario, the shelter units provide living/sleeping quarters but are augmented with other system components such as portable power generators, climate control equipment, and sanitation facilities. While this scenario would require more time to implement than a soft deployment, it could still be completed in a very rapid manner—only adding a few hours overall to the deployment timeframe. A hard deployment would allow aid and housing to be delivered wherever it is needed most, regardless of the conditions present there before, during, or after a disaster event. With the system in this configuration, a deployment site can be as diverse as a shopping center parking lot, an elevated roadway, a parking garage, a vacant lot, or simply an empty pasture. In the hard deployment, either the soft-wall shelters or the rigid shelters or some combination thereof can be used.

When not in use, both of the shelter concepts are able to nest with similar shelters and flat pack for storage and transport. They can be stored efficiently until they are needed due to their rugged, all weather design which allows them to endure very long term storage spans without decay or wear. All system components can be stored in centralized warehouse type facilities that could serve as distribution centers. These facilities would be located near major thoroughfares, rail lines, airports, or ports. These distribution centers may be stocked with certain system components to allow for a more appropriate response to the typical types of disasters in a particular region. System components can then be rapidly loaded and transported from these storage facilities to the predetermined deployment sites using various modes of transit that may be available at a given moment or location.

Thus, an embodiment of this invention is a shelter comprising a rigid top frame structure, a rigid bottom frame structure, and one or more collapsible support arms connecting the top frame structure to the bottom frame structure, wherein the frame structures and the collapsible support arm(s) are sized and configured to form a shelter frame when the collapsible support arm(s) are in a fully extended position, and wherein the top frame structure is brought into proximity with the bottom frame structure when the collapsible support arm(s) are in a collapsed position.

Another embodiment of the present invention is a rigid shelter comprising a hard shell member having a three-dimensional shape which forms a shelter compartment, and a rigid floor member, wherein the hard shell member and the rigid floor member are interlockable one to the other.

Yet another embodiment of the present invention is a system comprised of a plurality of shelters in accordance with the teachings herein and a canopy sized and configured to be draped and anchored over the top frame structures of the shelters when the shelters are placed in sufficient proximity to each other.

Still another embodiment of the present invention is a system of shelters comprising at least two rigid shelters in accordance with the teachings herein and at least one rigid connector module, wherein each rigid connector module is sized and configured to connect a window opening of a first rigid shelter to a doorway opening of a second rigid shelter.

Another embodiment of the present invention is a system of shelters comprising a plurality of rigid shelters in accordance with the teachings herein and a canopy sized and configured to be draped and anchored over the hard shell members of the rigid shelters when the rigid shelters are placed in sufficient proximity to each other.

Yet another embodiment of the present invention is a method for rapid deployment of temporary housing comprising providing a shelter system which comprises a plurality of collapsible shelter structures wherein each shelter structure is comprised of a substantially uniform rigid top frame structure and a substantially uniform rigid bottom frame structure, collapsing the shelter structures by urging each top frame structure and its respective bottom frame structure closer together, loading a plurality of the shelter structures on one or more transportation units, and unloading and expanding the collapsed shelter structures.

Still another embodiment of the present invention is a method for rapid deployment of temporary housing comprising providing a shelter system which comprises a plurality of stackable shelter units wherein each shelter unit is comprised of a substantially uniform rigid top and a removable rigid bottom, separating each rigid top from its respective rigid bottom, stacking the rigid tops and/or the rigid bottoms, loading the stacked rigid tops and stacked rigid bottoms on one or more transportation units, and unloading and assembling the rigid tops and rigid bottoms to form the shelter units.

These and other embodiments and features of this invention will be still further apparent from the ensuing description, accompanying figures and appended claims.

BRIEF DESCRIPTION OF THE DRAWINGS

FIGS. 1A-1M and 1R depict one particular embodiment of the present invention, specifically a soft-wall shelter of this invention, while

Like reference numbers or letters in the figures are used to refer to like or functionally like parts among the several figures.

FURTHER DETAILED DESCRIPTION OF THE INVENTION

Figure 1A:
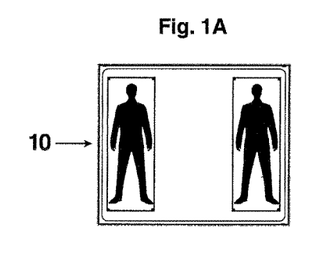
Figure 1B:
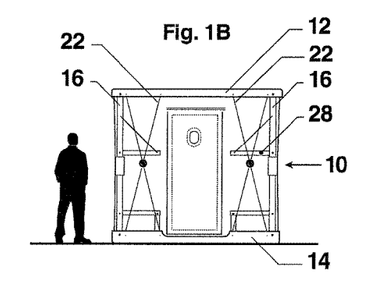
Figure 1C:
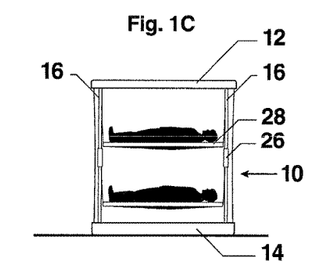
Figure 1D:
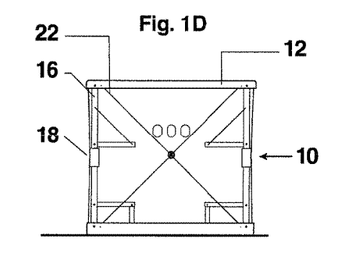
Figure 1E:
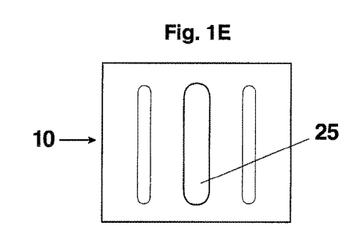
Figure 1F:
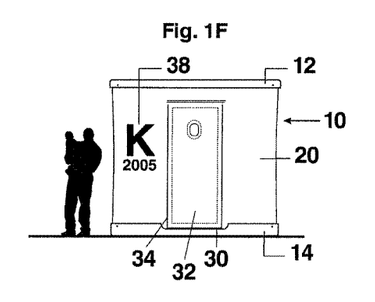
Figure 1G:
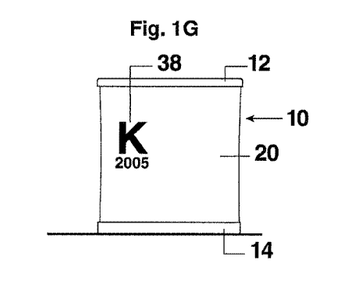
Figure 1H:
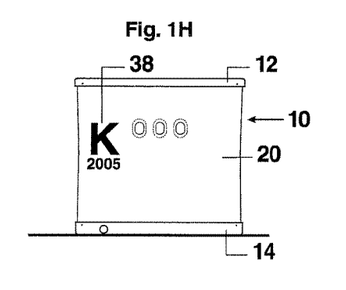
Figure 1I:
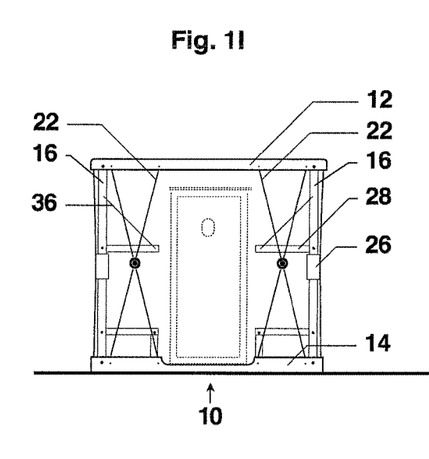
Figure 1J:
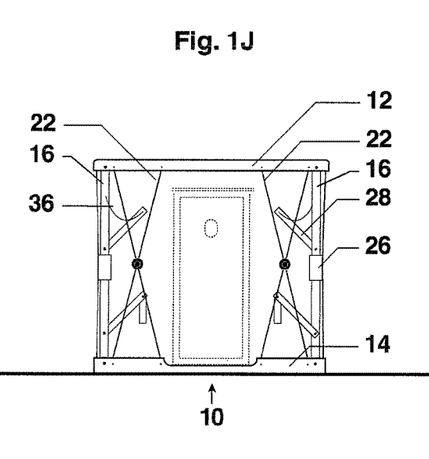
Figure 1K:
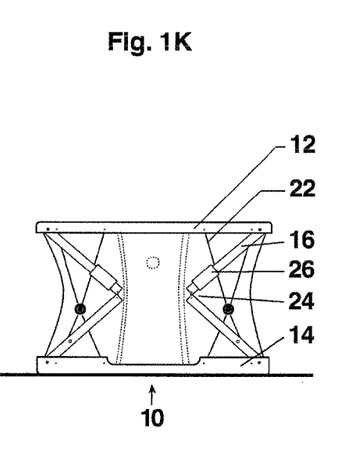
Figure 1L:
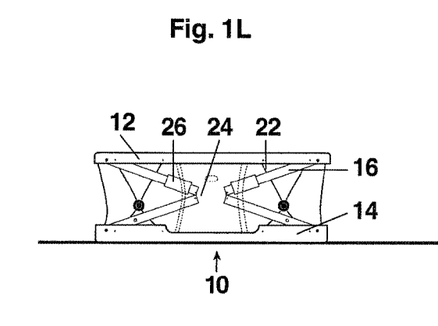
Figure 1M:
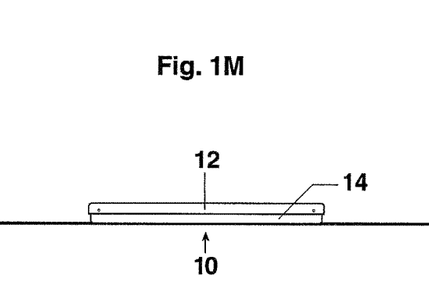
Figure 1N:
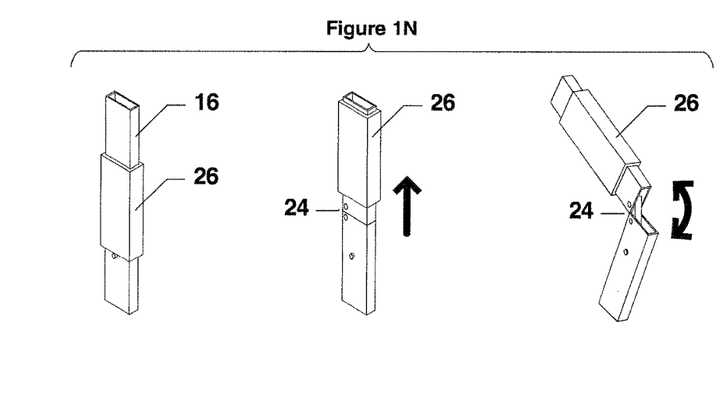
FIGS. 1N-1Q depict a magnified view of a collapsible support arm with hinge and locking mechanism of this particular embodiment of the present invention.
Figure 1O:
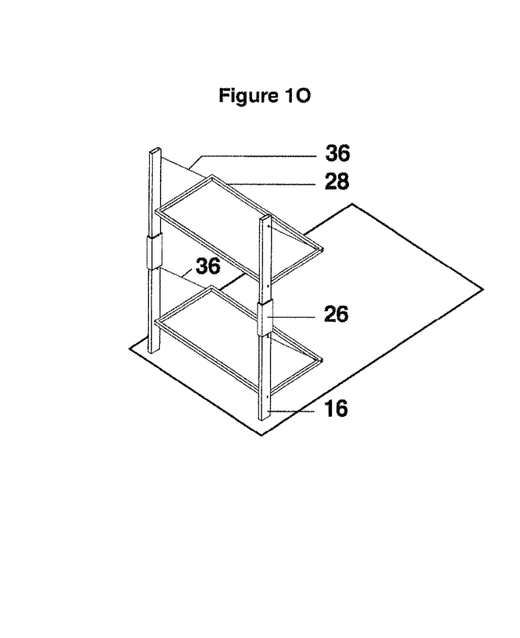
Figure 1P:
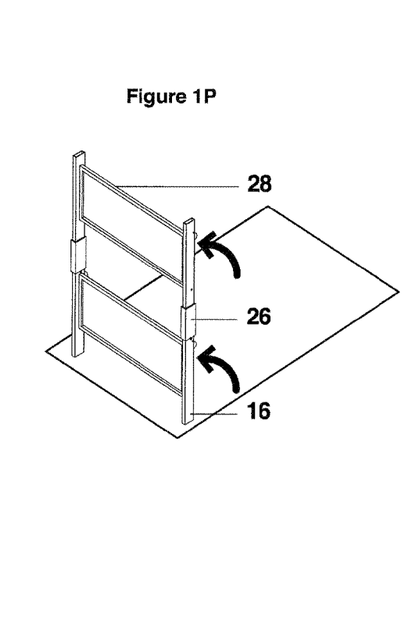
Figure 1Q:
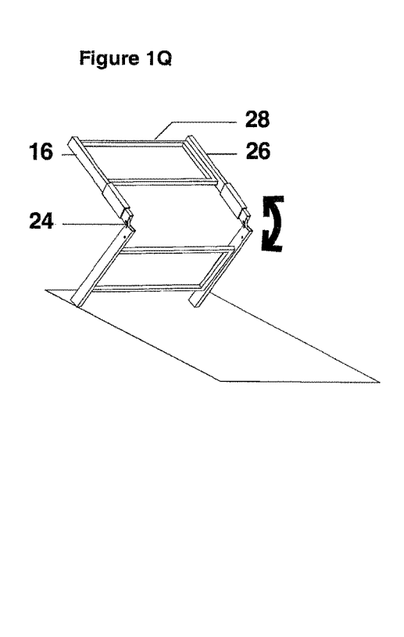
Figure 1R:
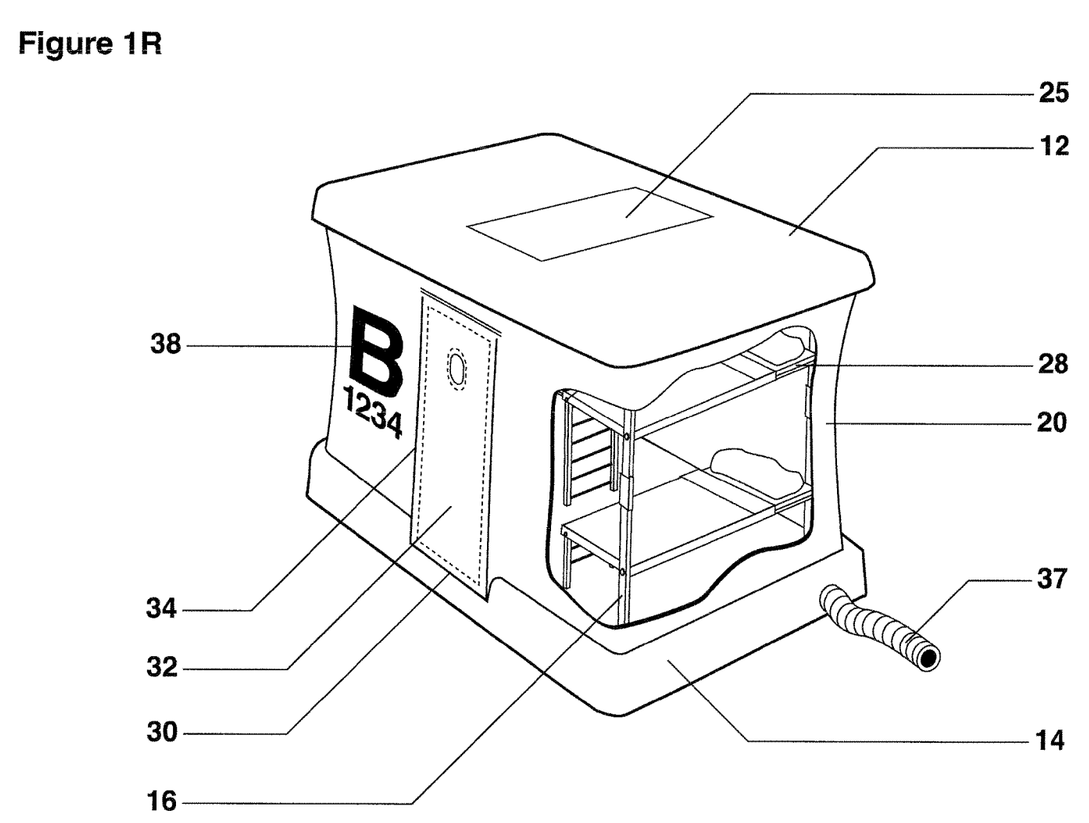
Figure 2A:
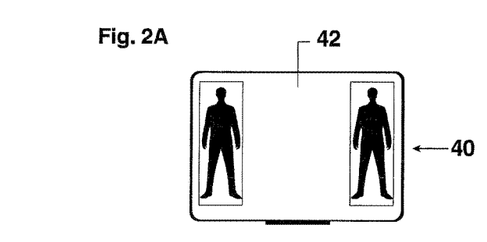
FIG. 2A-2I depict another particular embodiment of the present invention, specifically a rigid version of a shelter of this invention.
Figure 2B:
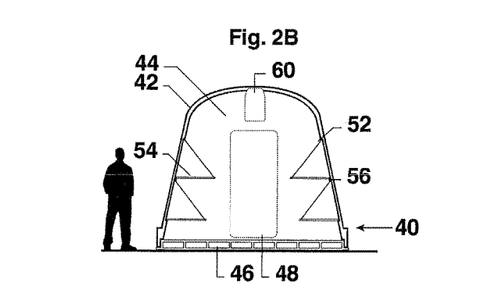
Figure 2C:
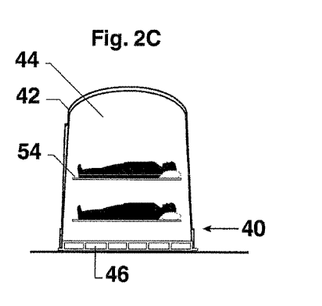
Figure 2D:
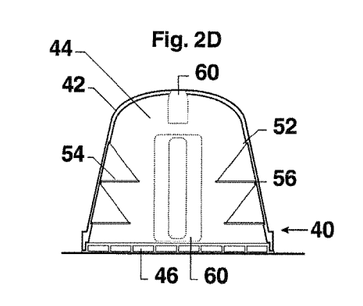
Figure 2E:
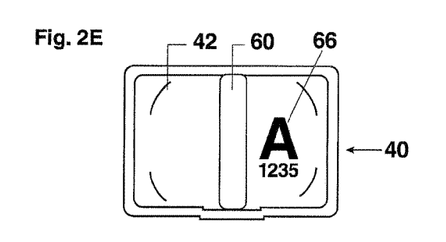
Figure 2F:
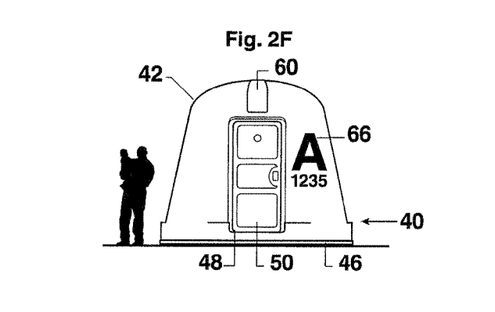
Figure 2G:
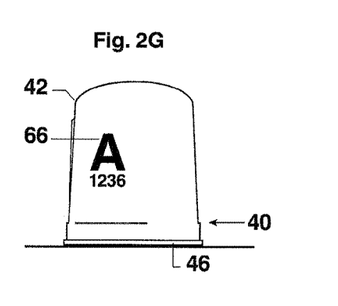
Figure 2H:
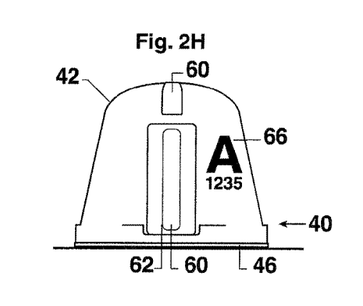
Figure 2I:
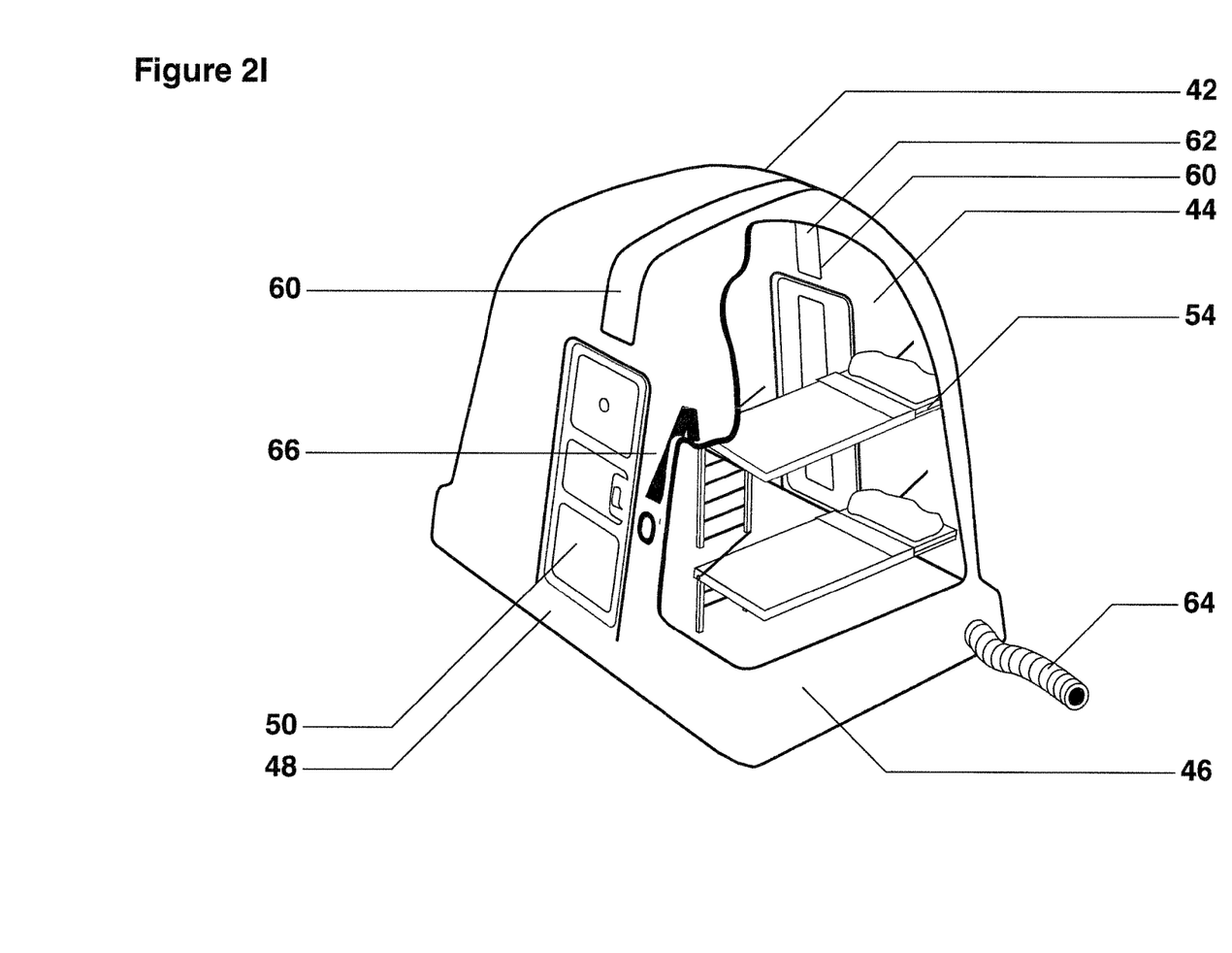

Referring now to FIGS. 1A-1R, these figures depict one particular embodiment of the present invention, specifically a soft-wall shelter of this invention. In the absence of any covering, FIG. 1A represents the plan view of shelter, FIG. 1B a front section of the shelter, FIG. 1C a side section of the shelter, and ID a rear section of the shelter. FIG. 1E depicts a plan view of the shelter, FIG. 1F a front elevation view of the shelter, FIG. 1G a side elevation view of the shelter, and FIG. 1H a rear elevation view of the shelter. FIGS. 1I-1M represent the steps of collapsing a shelter from being erect to being completely collapsed and ready for transport or storage. Finally, FIG. 1N is a cut-away view of a particular embodiment of a soft-wall shelter. In this particular embodiment of the present invention a shelter 10 comprises a rigid top frame structure 12 which is generally rectangular in shape, a rigid bottom frame structure 14 which is generally the same size and shape of the rigid top frame structure 12, four collapsible support arms 16 connecting the top frame structure 12 to the bottom frame structure 14, and multiple support cables 22 attaching the top frame structure 12 to the bottom frame structure 14, wherein the support cables 22 are sized and configured to prevent sway of the shelter 10. The frame structures 12, 14 and the collapsible support arms 16 are sized and configured to form a shelter frame 18 when the collapsible support arms 16 are in a fully extended position as in FIG. 1M, and wherein the top frame structure 12 is brought into proximity with the bottom frame structure 14, when the collapsible support arms 16 are in a collapsed position as in FIG. 1M. The four collapsible support arms 16 each are comprised of at least one hinge 24, wherein the hinge 24 is positioned approximate to a midpoint along the length of the collapsible support arm 16, and a locking mechanism 26 proximate to the hinge 24, wherein the locking mechanism 26 is sized and configured to lock the collapsible support arm 16 in the fully extended position and wherein the locking mechanism 26 is a moveable, rigid sheath sized and configured to cover the hinge 24 and to slide up the collapsible support arm 16 to uncover the hinge 24, as can be seen in FIG. 1N in a magnified view of the hinge and locking mechanism. The rigid top frame structure 12 of this embodiment of the invention also has as skylight window 25. The bottom frame structure 14 is at least partially hollow and is sized and configured to receive and retain water for anchoring the shelter 10 in place. The shelter in this particular embodiment also comprises four beds 28 each attached to two bed support cables 36 and two support arms 16, wherein each bed 28 is sized and configured so that the bed 28 can alternatively be placed in a substantially horizontal position supported by the two bed support cables 36 or in a substantially vertical position, and wherein the bed 28 can be nested in a substantially vertical plane that is substantially parallel to or substantially the same as a substantially vertical plane defined by two of the collapsible support arms 16 which are adjacent to one another when the bed 28 is in the substantially vertical position. Also, the shelter further comprises a covering 20 complimentary in shape to the shelter 10, wherein the covering 20 defines at least one door opening 30, and wherein the shelter 10 further comprises a door 32 operatively connected to the shelter 10 at the door opening 30 and a zipper 34 for attaching a perimeter portion of the door 32 to a perimeter portion of the door opening 30. Also, as can be seen in the cut-away view of FIG. 1R, a particular embodiment of the present invention has a climate control conduit and electrical conduit duct 37 connected to the bottom frame structure 14 of the shelter 10 through which a power generator and climate control equipment are operatively connected to the shelter 10. Also, as can be seen in FIGS. 1F-1H and 1R, in this particular embodiment, each shelter unit will have an address and/or zone indicator 38 in order to help keep track of the shelters and of families and individuals who use the shelters. In FIGS. 1F-1H and 1R, the address and/or zone indicator 38 is on a front, a side, a rear, and a front side of the shelter unit, respectively.

In collapsing the soft-wall shelter of the first particular embodiment of the present invention for storage and/or transportation, the four beds 28 are folded up and nested into the substantially vertical plane defined by two of the collapsible support arms 16 which are adjacent to one another when the bed 28 is in the substantially vertical position, as depicted in FIG. 1P, and a latch is used to keep the beds 28 in the substantially vertical position. Then, the locking mechanism 26 is slid up the collapsible support arm 16 to uncover the hinge 24 as seen in the magnified view in FIG. 1N, which hinge 24 is then folded as in FIGS. 1K, 1L, 1N, and 1Q, allowing the shelter frame 18 itself to fold inward to collapse the shelter 10, bringing the top frame structure 12 and the bottom frame structure 14 closer together as in FIG. 1M.

Referring now to FIGS. 2A-2I, these figures depict another particular embodiment of the present invention, specifically a rigid version of a shelter of this invention. The rigid shelter 40 comprises a hard shell member 42 having a three-dimensional shape which forms a shelter compartment 44 and a rigid floor member 46, wherein the hard shell member 42 and the rigid floor member 46 are interlockable one to the other. The rigid floor member 46 is partially hollow and is sized and configured to receive and retain water as a weighting substance. The shelter of this particular embodiment also comprises a rigid frame 52 on the inside of the hard shell member 42 wherein the rigid frame 52 is substantially the same size and shape as the hard shell member 42 and wherein the rigid frame 52 is connected to the hard shell member 42 in at least one spot. The shelter 40 of this particular embodiment further comprises four beds 54 each supported by two support members 56 of the rigid frame 52, wherein each bed 54 is attached to the rigid frame 52 in at least one location, wherein each bed 54 is sized and configured so that the bed 54 can alternatively be placed in a substantially horizontal position or in a substantially vertical position, and wherein the bed 54 can be nested in a substantially vertical plane that is substantially parallel to or substantially the same as a substantially vertical plane defined by the two support members 56 of the rigid frame 52 adjacent to one another when the bed 54 is in the substantially vertical position. Also, in this particular embodiment, the shelter 40 further comprises at least one latch sized and configured for securing each bed 54 in the substantially vertical position when nested. Also, the hard shell member 42 defines at least one door opening 48, and a door 50 operatively connected to the shelter 40 at the door opening 48 which door 50 can be locked, as well as two window openings 60, wherein at least one of the window openings has a removable covering 62. As seen in the cut-away view of the shelter 40 in FIG. 2I, a particular embodiment of the present invention has a climate control conduit and electrical conduit duct 64 connected to the a rigid floor member 46 of the shelter 40 through which a power generator and climate control equipment are operatively connected to the shelter 40. Also, as can be seen in FIGS. 2E-2I, in this particular embodiment, each shelter unit will have an address and/or zone indicator 66 in order to help keep track of the shelters and of families and individuals who use the shelters. In FIGS. 2E-2I, the address and/or zone indicator 66 is on a top, a front, a side, a rear, and a front side of the shelter unit, respectively.

Figure 3A:
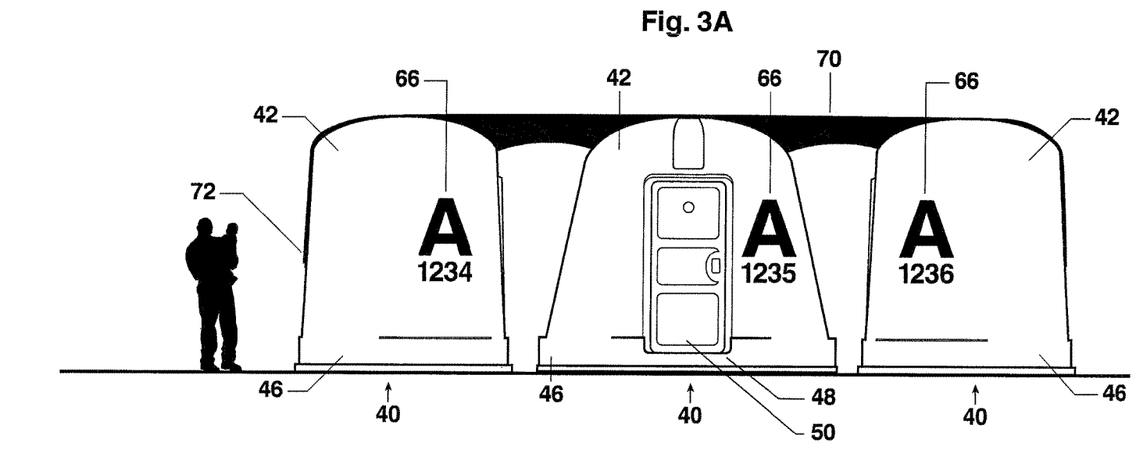
FIGS. 3A-3B depict still another particular embodiment of the present invention, specifically a particular system of shelters of the present invention.
Figure 3B:
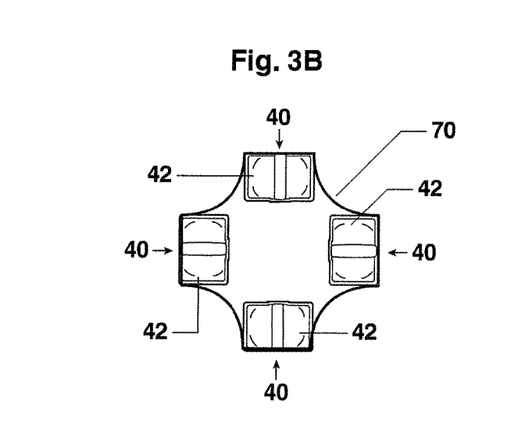

Referring now to FIGS. 3A and 3B, a particular system of shelters is depicted, which may be used for either soft-wall shelters 10 or rigid shelters 40. FIG. 3A is an elevation view of this particular embodiment using rigid shelters 40, while FIG. 3B is a plan view of this particular embodiment using rigid shelters 40. In this embodiment, the system is comprised of a plurality of rigid shelters 40 and a canopy 70 sized and configured to be draped, pulled tightly, and anchored to the hard shell members 42 of the rigid shelters 40 using a distal anchor device 72. The rigid shelters 40 are placed in sufficient proximity to each other for the canopy 70 to cover and anchor to each rigid shelter 40 in the system, in the particular grouping as shown in FIG. 3B.

Figures 4A, 4B:
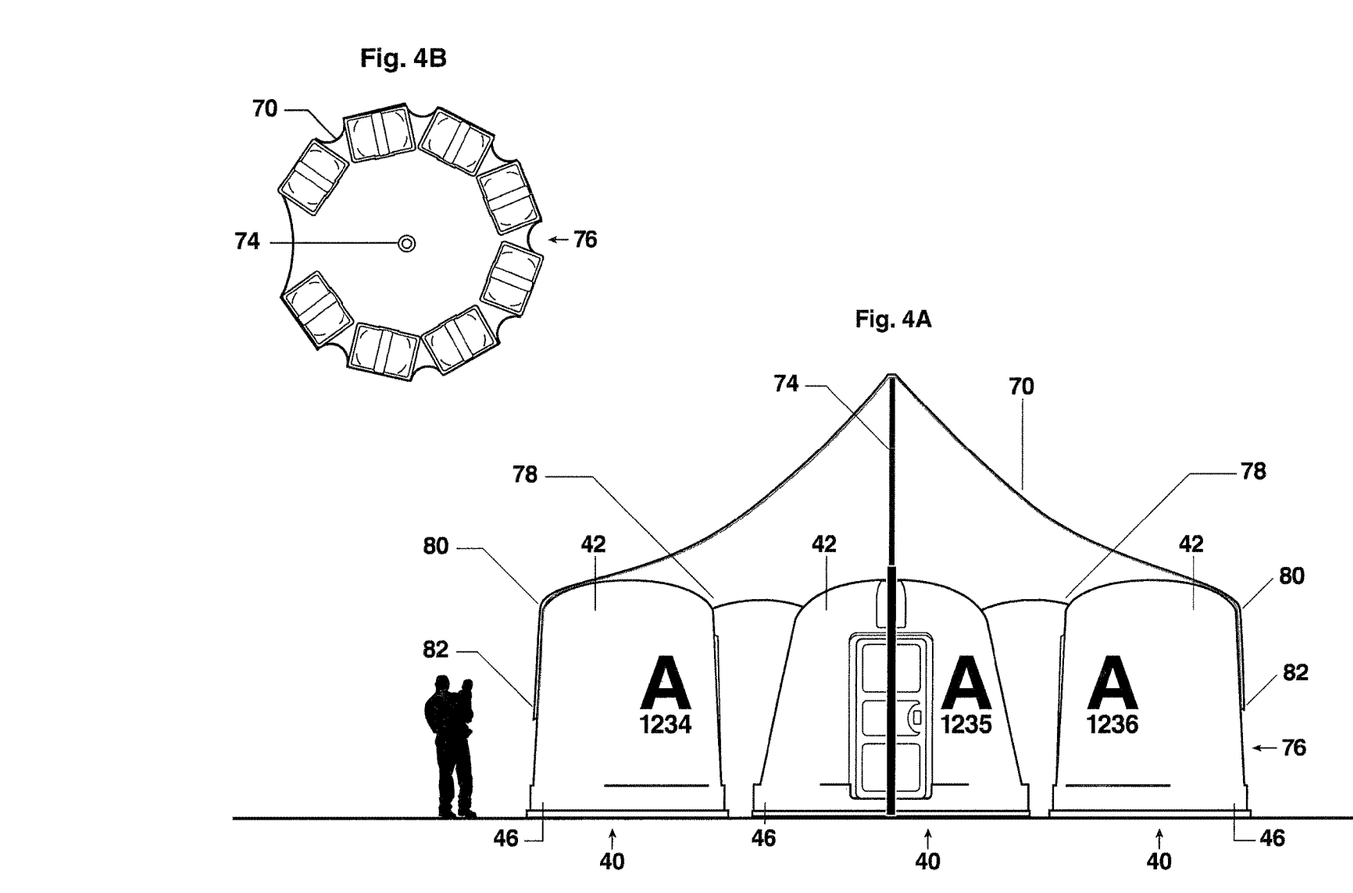
FIGS. 4A-4B depict still another particular embodiment of the present invention, specifically another particular system of shelters of the present invention

Referring now to FIGS. 4A and 4B, another particular system of shelters is depicted, which may be used for either soft-wall shelters 10 or rigid shelters 40. FIG. 4A is an elevation view of this particular embodiment employing rigid shelters 40, while FIG. 4B is a plan view of this particular embodiment employing rigid shelters 40. In this particular embodiment, a pole 74 is deployed vertically to a height at least as high as the top of the rigid shelters 40, and the rigid shelters 40 are placed around the pole 74 to form a pod 76, such that one side of each rigid shelter 40 is proximal 78 to the pole 74 and an opposing side of each rigid shelter 40 is distal 80 to the pole 74, wherein the canopy 70 is sized and configured to drape from near the top of the pole 74 to the distal side 80 of each rigid shelter 40 in the pod 76, and wherein at least one distal anchor device 82 is attached at least to the distal side 80 of at least one rigid shelter 40 and is sized and configured to connect the canopy 70 to the rigid shelter 40.

Figure 5A:
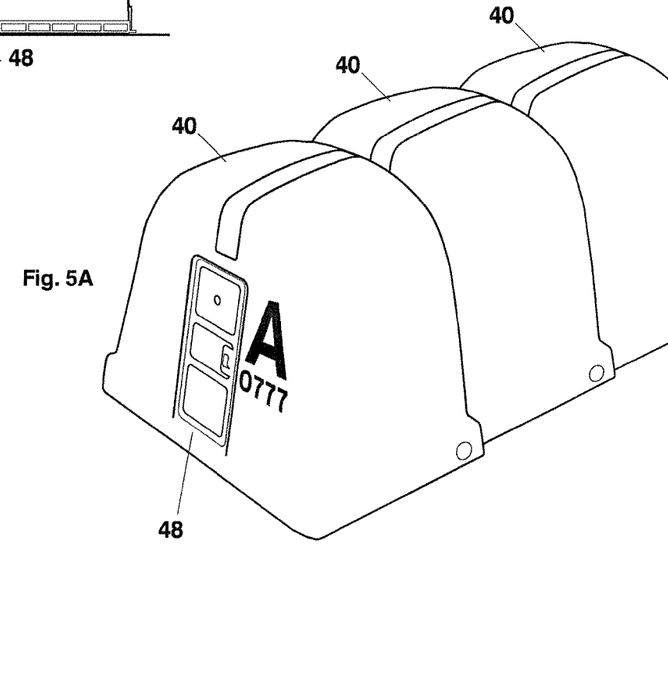
FIGS. 5A-5B depict yet another particular embodiment of the present invention, specifically another particular system of shelters of the present invention.
Figure 5B:
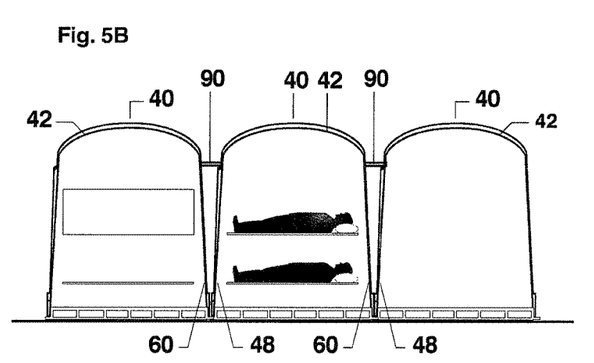

Referring now to FIGS. 5A and 5B, these figures depict a particular system of shelters of this invention comprising three rigid shelters 40 of this invention and two rigid connector modules 90, wherein each rigid connector module 90 is sized and configured to connect a window opening 60 of a first rigid shelter 40 to a doorway opening 48 of a second rigid shelter 40.

Figure 6A:
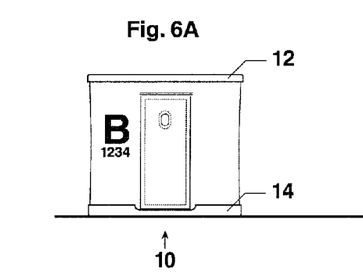
FIGS. 6A-6D depict a particular method for rapid deployment of temporary housing.
Figure 6B:
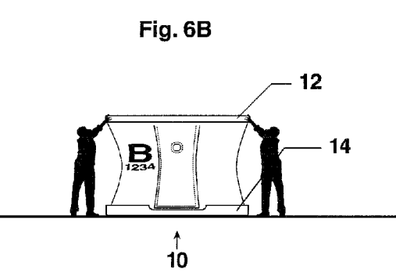
Figure 6C:
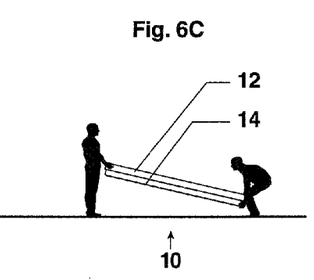
Figure 6D:
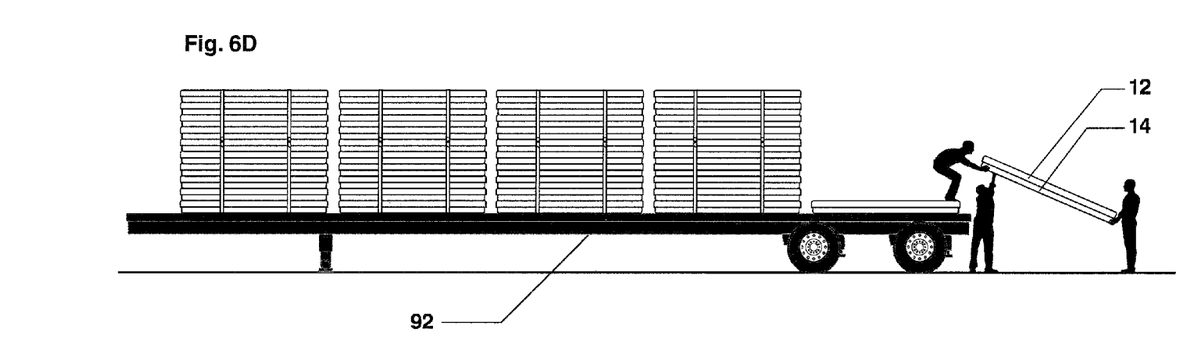

Referring now to FIGS. 6A-6D, these figures depict a particular method for rapid deployment of temporary housing comprising providing a shelter system which comprises a plurality of collapsible shelter structures, such as those depicted in FIGS. 1A-1Q and FIG. 6A, wherein each shelter structure 10 is comprised of a substantially uniform rigid top frame structure 12 and a substantially uniform rigid bottom frame structure 14, with the method of rapid deployment of this invention comprising collapsing each shelter structure 10 by urging a top frame structure 12 and its respective bottom frame structure 14 closer together as seen in FIGS. 6B and 6C, and loading a plurality of the shelter structures 10 on one or more transportation units as seen in FIG. 6D, a semi flatbed truck in this instance 92. Then, upon reaching a specific deployment destination, the collapsed shelter structures may also be unloaded and expanded into shelter structures 10.

Figure 7A:
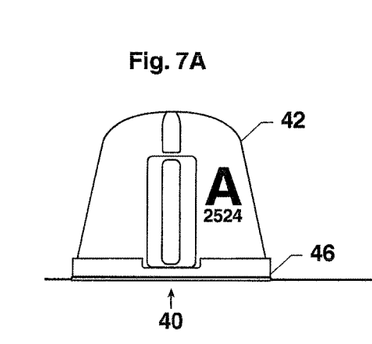
FIGS. 7A-7D depict yet another particular method for rapid deployment of temporary housing.
Figure 7B:
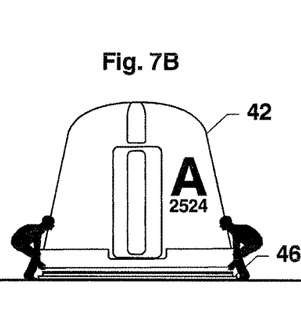
Figure 7C:
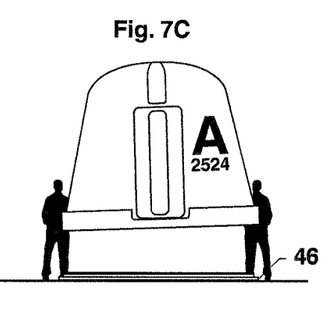
Figure 7D:
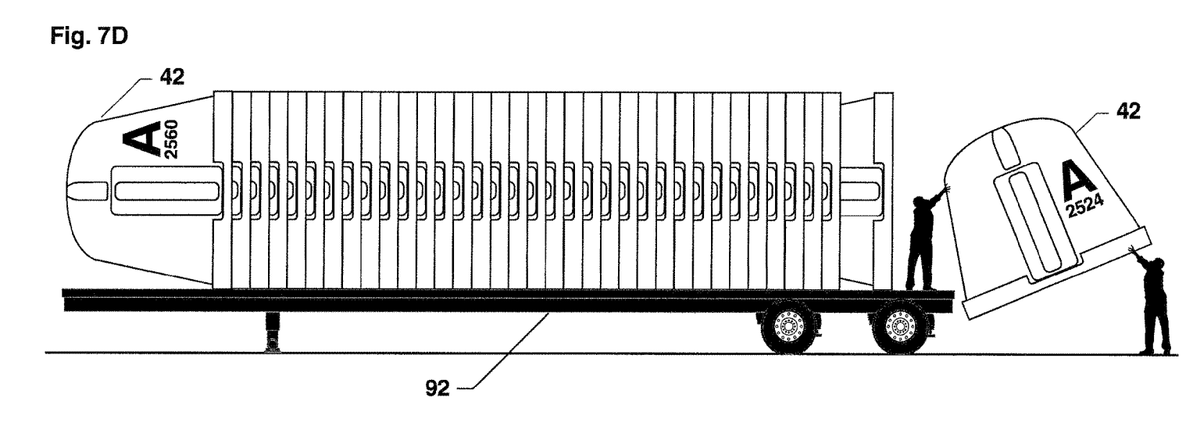

Referring now to FIGS. 7A-7D, these figures depicts yet another particular method for rapid deployment of temporary housing comprising providing a shelter system which comprises a plurality of stackable shelter units 40, such as those depicted in FIGS. 2A-2H and in FIG. 7A, wherein each shelter unit 40 is comprised of a substantially uniform rigid top 42 and a removable rigid bottom 46, with the method of rapid deployment of this invention comprising separating each rigid top 42 from its respective rigid bottom 46 as seen in FIGS. 7B and 7C, stacking and loading the rigid tops 42 and/or the rigid bottoms 46 on one or more transportation units such as seen in FIG. 7D, a semi flatbed truck in this instance 92. Then, upon reaching a specific deployment destination, the rigid tops 42 and rigid bottoms 46 may be unloaded and assembled to form the shelter units 40.

As discussed supra, in one particular embodiment of the present invention, the soft-wall, collapsible shelters, the rigid top and bottom frame structures of the present invention may be any matching shape and size and comprised of any rigid material. Preferably the rigid top and bottom frame structures are similarly sized and rectangular in shape and comprised of a metal or hard plastic material. Most preferably, the rigid top and bottom frame structures are comprised of a metal frame, insulation material, and a hard plastic material. The shelters may also vary in size, but preferably the shelters are between 6' to 10' wide, 6' to 10' deep, and 6' to 10' tall. Most preferably, the shelters are approximately 9'4" wide, 8'0" deep, and 8'6" tall. Also, preferably, bottom frame structure is at least partially hollow and is sized and configured to receive and retain a weighting substance for anchoring the shelter in place. Any weighting substance may be used, preferably the weighting substance is not flammable and is readily available at a shelter deployment site and preferably the weighting substance is in liquid or granular form. Preferred weighting substances that can be used including water, sand, soil, or gravel. The most preferred weighting substance is water.

The collapsible support arms connecting the top frame structure to the bottom frame structure of the present invention may also be comprised of any rigid material. Preferably, there are four collapsible support arms in each shelter, placed near corresponding corners of the rigid top and bottom frame structures of the shelter, and preferably the four collapsible support arms are comprised of a rigid material. Examples of a suitable rigid material would be metals, wood, and fiberglass. Preferably the collapsible support arms are comprised of a metal material, and most preferably are comprised of aluminum. Also, preferably, the collapsible support arms each are comprised of at least one hinge, wherein the hinge is positioned approximate to a midpoint along the length of the collapsible support arm, and wherein each collapsible support arm further comprises a locking mechanism proximate to the hinge, wherein the locking mechanism is sized and configured to lock the collapsible support arm in the fully extended position. Any hinge will work with the collapsible support arms of the present invention as long as the hinge allows the top and bottom rigid frame structures to be urged together when collapsing the collapsible support arms. Examples of suitable hinges include a pivot point or pin hinge, most preferable is the pivot-point or pivot-pin type of hinge, an example of which is the hinge depicted in FIG. 1N. The locking mechanism may be any mechanism which can lock the collapsible support arm in a fully extended position while the shelter is in a deployed configuration, such as a pin or a rigid sheath. Most preferably, the locking mechanism is a moveable, rigid sheath sized and configured to cover the hinge and to slide up and/or down the collapsible support arm to uncover the hinge.

The covering complimentary in shape to the shelter may be comprised of any flexible material. Preferably, the covering is comprised of nylon, polyester, or canvas material. Most preferably the covering is comprised of Polyester. Also, the covering may either encase the collapsible support arms of the present invention, or the collapsible support arms may be external to the covering. Preferably, the covering may either encase the collapsible support arms and protects the collapsible support arms from the elements. The covering also preferably comprises an elastic band and insulation. Preferably, the elastic band is connected to or integral with the covering, wherein the elastic band is sized and configured to put tension on the covering, to thereby facilitate collapsing the support arms for transport or storage of the shelter wherein the covering and any support cables are drawn in between the top and bottom frame structures when the shelter is in the collapsed position. The elastic band may be comprised of any elastic material.

The support cable in one embodiment of the present invention attaching the top frame structure to the bottom frame structure may also be made of any material, wherein the support cable is sized and configured to prevent sway of the shelter. Preferably, there are at least 6 support cables forming 3 "X" patterns, connected between the rigid top and bottom frame structures of each shelter, and preferably, the support cables are comprised of any flexible metal cable, such as aircraft cable).

The latch in one embodiment of the present invention, which is sized and configured for securing a bed in the substantially vertical position, may be any type of mechanical mechanism which may secure the bed in the substantially vertical position. Examples of a suitable latch of this invention would include a spring-loaded pull, a spring-loaded pin, a spring latch, a slam latch, a compression latch, a draw latch, a keeper latch, a gravity latch, a gate latch, a rotary latch, a cam latch, or any similar type of fastening mechanism. The latch may be comprised of any material, preferably a hard plastic or metal material. Most preferably, the latch is a spring-loaded pin and is comprised of metal. The door of this embodiment of the present invention may be of any material, either flexible or rigid, and may be attached to a corresponding door opening using any attaching mechanism, including a zipper, a lock, a latch, a catch, a pin, by frictional contact, hook and loop fasteners, magnetic clasp/seal, or other similar attaching mechanisms. Preferably, the door is made of a flexible material and is attached to the door opening using a zipper mechanism.

Preferably, the rigid floor member of one particular embodiment of this invention is at least partially hollow and is sized and configured to receive and retain a weighting substance for anchoring the shelter in place. Any weighting substance may be used. Preferably the weighting substance is in liquid or granular form, is not flammable, and is readily available at a shelter deployment site. Examples of suitable weighting substances that can be used in this invention include water, sand, soil, or gravel. The most preferred weighting substance is water.

The door of this embodiment of the present invention may be of any material, either flexible or rigid, and may be attached to a corresponding door opening using any attaching mechanism, including a zipper, a lock, a latch, a catch, a pin, by frictional contact, or other similar attaching mechanisms. Preferably, the door is comprised of a rigid material and is attached to the door opening using a lock mechanism. Most preferably, the door is comprised of a hard plastic or metal material. The rigid frame of this particular embodiment of the present invention may be comprised of any rigid material. Preferably, the rigid frame is comprised of a hard plastic or a metal material.

Examples of a suitable latch sized and configured for securing the bed in the substantially vertical position of this particular embodiment of the present invention would include a spring-loaded pull, a spring-loaded pin, a spring latch, a slam latch, a compression latch, a draw latch, a keeper latch, a gravity latch, a gate latch, a rotary latch, a cam latch, or any similar type of fastening mechanism. The latch may be comprised of any material, preferably a hard plastic or metal material. Most preferably, the latch is a slam latch and is comprised of metal.

In the particular embodiment of this invention where a system comprises a plurality of shelters and a canopy sized and configured to be draped and anchored over the top frame structures of the shelters when the shelters are placed in sufficient proximity to each other, either the soft-wall shelters or the rigid shelters may be employed. The canopy of this particular embodiment may be comprised of any material. Suitable materials include nylon, polyester, or canvas material. Preferably, the materials are waterproof or have been waterproofed prior to use as a canopy of this invention. Most preferably the canopy is comprised of a waterproof or waterproofed canvas.

In the particular embodiment in which a pole is deployed as part of the system of shelters, which may include a system of soft-wall shelters or rigid shelters, the pole of the present invention may be comprised of any rigid material, preferably a metal material. Also, preferably, the pole is deployed vertically by any means which secures the pole in a substantially vertical position. Suitable examples of securing the pole in a substantially vertical position include digging a hole in the ground and placing a portion of a base end of the pole into the hole, weighting a base end of the pole with various weighting mechanisms, placing objects around a base end of the pole to prevent movement of the pole, or by attaching a large base to the foot of the pole and tensioning the canvas against their anchor points. In placing the shelters around the pod, the distance of the shelters from the pole may be predetermined or may be determined based on the size of the canopy. The shelters may be the same distance from the pole, or they may be varying distances from the pole, so long as the canopy is of sufficient size to drape from near the top of the pole to the distal side of each shelter in the pod. Also, the distal anchor device attached at least to the distal side of each shelter can be any device which sufficiently attaches and retains the canopy to the shelter. Suitable distal anchor devices include a prong, a bollard, a horseshoe anchor, a bolt, a hook, a pin, cleat, or other anchoring devices of the like. The most preferred distal anchor device is a cable and cleat.

In other particular embodiments of the present invention, the canopy may be comprised of an inner canopy and an outer canopy, wherein the proximal anchor is attached to at least one shelter on its proximal side, wherein the distal anchor is attached to at least one shelter on its distal side, wherein the inner canopy is sized and configured to drape from near the top of the pole to the proximal side of the shelter, whereby the proximal anchor device connects the inner canopy to the shelter, and wherein the outer canopy is sized and configured to drape from near the top of the pole to the distal side of the shelter, whereby the distal anchor device of the shelter connects the outer canopy to the shelter. While with this particular embodiment, either the soft-wall shelters or the rigid shelters may be employed, preferably, this embodiment is used with the soft-wall shelters. Like the distal anchor device discussed above, the proximal anchor device can be any device which sufficiently attaches and retains the canopy to the shelter. Suitable proximal anchor devices include a prong, a bollard, a cleat, a stake, a horseshoe anchor, a bolt, a hook, a pin or other anchoring devices of the like. The most preferred proximal anchor device is a cable and cleat.

In another particular embodiment of the present invention, the rigid connector module may be any device which connects the window opening of the first rigid shelter to the doorway of the second rigid shelter, which allows ingress and egress between the first rigid shelter and the second rigid shelter. The rigid connector module may be comprised of any rigid material, preferably a hard plastic or metal.

The collapsible shelter structures used in another particular embodiment of the present invention for rapid deployment of temporary housing may be any collapsible shelter. Preferably, the collapsible shelter structures are the soft-wall shelters of a preferred embodiment of the present invention.

The stackable shelter units used in another particular embodiment of the present invention for rapid deployment of temporary housing may be any shelter which may be stacked. Preferably, the stackable shelter structures are the rigid shelters of a preferred embodiment of the present invention.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation within the spirit and scope of the appended claims, and should not be construed as limited to the foregoing illustrated embodiments.

The invention claimed is:

1. A portable shelter, comprising:
    a single-piece rigid, exterior, three-dimensional shell that comprises a curved profile and defines at least a portion of a human-occupiable volume therein, the curved profile comprising a rigid wall that comprises at least four sides, at least two of the sides being tapered from a bottom edge of the rigid wall to a top of the rigid wall such that the four sides of the rigid wall meet the top of the rigid wall with a radius, the shell defining at least one door opening;
    a rigid frame attached to an interior surface of the shell and comprising a substantially same size and shape as the shell;
    a rigid base attachable to the single-piece rigid exterior shell, the single-piece rigid exterior shell configured to detach from the rigid base and stack and load into a human-occupiable volume of another single-piece rigid, exterior, three-dimensional shell for transportation of the shells; and
    a furniture member pivotally attached to the rigid frame to adjust between a deployed position with the furniture member extending toward a center of the human-occupiable volume, and a stored position with the furniture member extending against the rigid exterior shell to expose the human-occupiable volume to receive another rigid exterior shell therein,
    wherein the furniture member comprises a first bunk bed, the portable shelter further comprising a second bunk bed pivotally attached to the rigid frame below the first bunk bed.

2. The portable shelter of claim 1, further comprising:
    a third bunk bed pivotally attached to the rigid exterior shell opposite the first bunk bed; and
    a fourth bunk bed pivotally attached to the rigid exterior below the third bunk bed.

3. The portable shelter of claim 1, wherein the rigid base attached to the rigid exterior shell defines a bottom of the human-occupiable volume.

4. The portable shelter of claim 1, further comprising a latch configured to affix the furniture member in the stored position.

5. The portable shelter of claim 1, further comprising a location indicator positioned on an outer surface of the rigid exterior shell.

6. The portable shelter of claim 1, wherein the furniture member is positioned horizontally in the deployed position, and the furniture member is positioned vertically in the stored position.

7. A shelter system, comprising:
    a first portable shelter, comprising:
        a first single-piece rigid, exterior, three-dimensional shell that comprises a curved profile and defines at least a portion of a first human-occupiable volume therein, the curved profile of the first rigid exterior shell comprising a first rigid wall that comprises at least four sides, at least two of the sides being tapered from a bottom edge of the first rigid wall to a top of the first rigid wall such that the four sides of the first rigid wall meet the top of the first rigid wall with a radius, the first single-piece rigid shell defining at least one door opening;

a first rigid frame attached to an interior surface of the first single-piece rigid shell and comprising a substantially same size and shape as the first single-piece rigid shell;

a first rigid base attachable to the first single-piece rigid exterior shell, the first single-piece rigid exterior shell configured to detach from the first rigid base; and a first furniture member pivotally attached to the first rigid frame to adjust between a deployed position with the first furniture member extending toward a center of the first human-occupiable volume, and a stored position with the first furniture member extending against the first single-piece rigid exterior shell to expose the first human-occupiable volume;

a second portable shelter, comprising:

a second single-piece rigid, exterior, three-dimensional shell that comprises a curved profile and defines at least a portion of a second human-occupiable volume therein, the curved profile of the second rigid exterior shell comprising a second rigid wall that comprises at least four sides, at least two of the sides being tapered from a bottom edge of the second rigid wall to a top of the second rigid wall such that the four sides of the second rigid wall meet the top of the second rigid wall with a radius, the second single-piece rigid shell defining at least one door opening;

a second rigid frame attached to an interior surface of the second single-piece rigid shell and comprising a substantially same size and shape as the second single-piece rigid shell;

a second rigid base attachable to the second single-piece rigid exterior shell, the second single-piece rigid exterior shell configured to detach from the second rigid base and stack and load into the first human-occupiable volume of the first single-piece rigid, exterior, three-dimensional shell for transportation of the first and second shells; and a second furniture member pivotally attached to the second rigid frame to adjust between a deployed position with the second furniture member extending toward a center of the second human-occupiable volume, and a stored position with the second furniture member extending against the second single-piece rigid exterior shell to expose the second human-occupiable volume.

8. The shelter system of claim 7, further comprising:

a pole; and a canopy sized to drape over the pole and over at least portions of the first and second portable shelters.

9. The shelter system of claim 7, wherein the stored position of the first furniture member comprises a vertical orientation of the first furniture member, and the deployed position comprises a horizontal orientation of the first furniture member.

10. The shelter system of claim 9, wherein the first furniture member is sized to support a human.

* * * * *